(12) United States Patent
Lisiak et al.

(10) Patent No.: US 6,271,746 B1
(45) Date of Patent: Aug. 7, 2001

(54) METHOD AND DEVICES FOR CONTROLLING THE USE OF AN AUTOMOTIVE HORN

(76) Inventors: Paul K. Lisiak, 200 Spring St., No. 1, New York, NY (US) 10012; Kenneth Lisiak, 8 Haskell Rd., Andover, MA (US) 01810

( * ) Notice: Subject to any disclaimer, the term of this patent is extended or adjusted under 35 U.S.C. 154(b) by 0 days.

(21) Appl. No.: 09/260,531

(22) Filed: Feb. 26, 1999

Related U.S. Application Data

(60) Provisional application No. 60/076,244, filed on Feb. 27, 1998.

(51) Int. Cl.7 .................................................. B60Q 1/00
(52) U.S. Cl. .................. 340/425.5; 340/466; 340/474
(58) Field of Search ................... 340/463, 466, 340/471, 474; 324/161, 168

(56) References Cited

U.S. PATENT DOCUMENTS

| | | |
|---|---|---|
| 3,477,405 | 11/1969 | Jensen .................................. 116/137 |
| 3,707,716 | 12/1972 | Goralnick ............................. 340/384 |
| 3,771,122 * | 11/1973 | Sattler ................................... 340/473 |
| 4,709,652 | 12/1987 | Douglass, Jr. et al. .............. 116/140 |
| 5,109,212 | 4/1992 | Cortinovis et al. .................. 340/384 |
| 5,481,243 | 1/1996 | Lurie et al. .......................... 340/467 |
| 5,576,684 | 11/1996 | Langford ............................... 338/50 |

* cited by examiner

*Primary Examiner*—Daryl Pope
(74) *Attorney, Agent, or Firm*—Darby & Darby

(57) ABSTRACT

Methods and devices for controlling the use of an automotive horn as a function of the speed, motion, vibration or acceleration of the automotive vehicle, are disclosed. The invention contemplates methods and devices for disabling the automotive horn for a certain period of time, abating the volume or noise level of the horn, or modifying the tone or sound of the horn to a tone or sound considered less offensive. In certain embodiments, the method of control includes electronic methods for controlling the horn by connection to the speedometer, accelerometer or braking system of the vehicle. Alternatively, motion sensors, vibration sensors, or acceleration sensors may be used to control the horn. The reduction in volume or modification of sound of the horn may be accompanied by flashing lights or other warning signals as a substitute for the horn.

10 Claims, 1 Drawing Sheet

METHOD AND DEVICES FOR CONTROLLING THE USE OF AN AUTOMOTIVE HORN

This patent application claims the priority of U.S. provisional patent application No. 60/076,274, filed date Feb. 27, 1998 which is incorporated herein by reference.

This invention is directed to the field of automotive horns, and methods, systems and devices for controlling the volume, noise level, tone or sound of the horn.

BACKGROUND OF THE INVENTION

Automotive horns are installed in almost all automobiles, trucks and other automotive vehicles. Automotive horns are intended for use as a warning device to provide warning to other drivers, bicyclists, pedestrians, bystanders, or animals of potential dangerous conditions in the vicinity of the automobile. For example, the horn may be used to warn pedestrians or persons in the path or vicinity of a moving vehicle of the presence or location of the vehicle.

In recent years, it has become increasingly apparent that automotive horns are commonly abused by drivers to show or vent frustration, or to express anger at actions by other drivers or bystanders that are perceived as discourteous. The abuse of the automotive horn by impatient or angry drivers is a common nuisance. Abuse of the automotive horn in this manner may be particularly prevalent in congested traffic conditions, such as in cities or heavily populated suburban areas where traffic is heavy. Nevertheless, abuse of automotive horns has become so common that it is of concern in a wide range of urban, suburban, or rural settings, for example in shopping malls, parking lots, and in the vicinity of sports arenas or recreation centers.

The abuse of automotive horns also raises a number of public safety issues. Abuse of automotive horns is associated with the increasing problem of "road rage," a condition caused by driver frustration. Under these circumstances, the abuse of the automotive horn may provoke a violent response by a nearby driver.

The abuse of automotive horns in the manner herein described is characterized by a length and repetition of horn use that is unnecessary when the horn is properly used, leads to annoyance to other drivers and non-drivers, and also increases the general level of "noise pollution".

Certain methods of modifying or controlling the use of the automotive horn are known in the prior art.

U.S. Pat. No. 5,109,212 to Cortinovis, describes an electronically controlled horn for motor vehicles which comprises a diaphragm and electromagnet of the type comprising a transducer, wherein the transducer senses the vibrations of the diaphragm and feeds a vibration-dependent electrical signal to a feedback circuit which controls the power supply to the electromagnet. The horn is characterized by a feedback circuit which includes an electronic power circuit controlled to process the electrical signal from the transducer in order to determine and generate the frequency and duty cycle for controlling the electronic power circuit under various environmental and electrical conditions.

U.S. Pat. No. 3,477,405, to Jensen, describes an adjustable frequency horn for use in an automotive vehicle, which comprises the use of two generally spirally-shaped air passages which are complimentary in shape and have axes which are positioned generally parallel to one another.

U.S. Pat. No. 3,707,716 to Goralnick, describes a multi-tone push button controlled electronic horn wherein the frequencies are determined by resistance and capacitance values, and the network is capable of operating at more than one repetition rate or frequency depending upon the condition of associated mechanical switching which connects the resistance or capacitance components into the network.

U.S. Pat. No. 5,576,684 to Langford, describes a device comprising a flexible potentiometer which can act as a horn actuator in an automobile horn control system.

U.S. Pat. No. 4,709,652 to Douglass, Jr., describes a pneumatic sweep generator for use as an audiosource in tests near vocal frequency ranges, wherein the volume of the horn may be controlled by air pressure and the tone of the horn is controlled by air velocity.

In addition, U.S. Pat. No. 5,481,243 to Lurie, describes a vehicle deceleration detection circuitry system, whereby the rear brake lights of an automotive vehicle may be controlled as a function of the deceleration of the vehicle. Lurie also contemplates an additional audible alert buzzer or horn which is activated to provide additional warning in the event of emergency braking.

However, none of the references herein described are directed to a solution to the particular problems caused by and associated with the abuse of the automotive horn.

Applicants have now discovered a device for addressing the particular problems associated with the abuse of the automotive horn. The invention is directed to controlling the use of the automotive horn as a function of the speed, motion, vibration or acceleration of the automotive vehicle.

It is an object of the invention to use methods and devices for disabling the automotive horn for a certain period of time, abating the volume or noise level of the horn, or modifying the tone or sound of the horn to a tone or sound considered less offensive, to combat the problems of abuse of the automotive horn.

It is a further object of the invention to use electronic methods for controlling the horn by connection to the speedometer, accelerometer or braking system of the vehicle.

It is a further object of the invention to use motion sensors, vibration sensors, or acceleration sensors to control the abuse of the automotive horn.

It is still a further object of the invention to use a reduction in volume or modification of sound of the horn and flashing lights or other warning signals as a substitute for the horn.

SUMMARY OF THE INVENTION

The invention comprises methods, systems and devices for controlling the abuse of an automotive horn by establishing a controlled use period. The invention includes an automotive horn control system for use in an automotive vehicle, which comprises a horn, a detector for determining the motion of the automotive vehicle, and a means for disabling or controlling the abuse of the horn for a period of time. The disabling or controlling of the horn may be activated by attainment or detection of a predetermined value of motion.

In certain particular embodiments, abuse of the horn is controlled by use of a device that limits the length of the sounding period of the horn, and subsequently prevents reactivation of the horn for a predetermined time period, or controlled use period. At the end of the predetermined period, the normal function of the horn is restored.

The device for controlling abuse of the horn may be activated, deactivated and reactivated by a selected vehicle speed, or by the use of brakes by the driver. Alternatively, the controlled use period may be activated by attainment of a predetermined value on a detector such as a motion sensor, vibration sensor, or acceleration (or deceleration) sensor, or by a combination of any of the above methods. For example, the invention contemplates a device that will disable the horn upon the attainment of a predetermined reading or value on one or more of the sensors for speed, brake activation, motion, vibration, acceleration or deceleration.

The controlled use period may involve a "locking out" or complete disablement of the horn, or may involve abating the volume or noise level of the horn or modifying the tone or sound of the horn to a tone or sound considered less offensive. Additionally, a warning light, such as a strobe light or flashing light, may be substituted for the horn for the controlled use period. The device may comprise electronic methods for controlling the horn by connection to the speedometer, accelerometer or breaking system of the vehicle. Additionally, motion sensors, vibration sensors or acceleration/deceleration sensors may be used to control the horn.

DETAILED DESCRIPTION OF THE INVENTION

Figure 1:
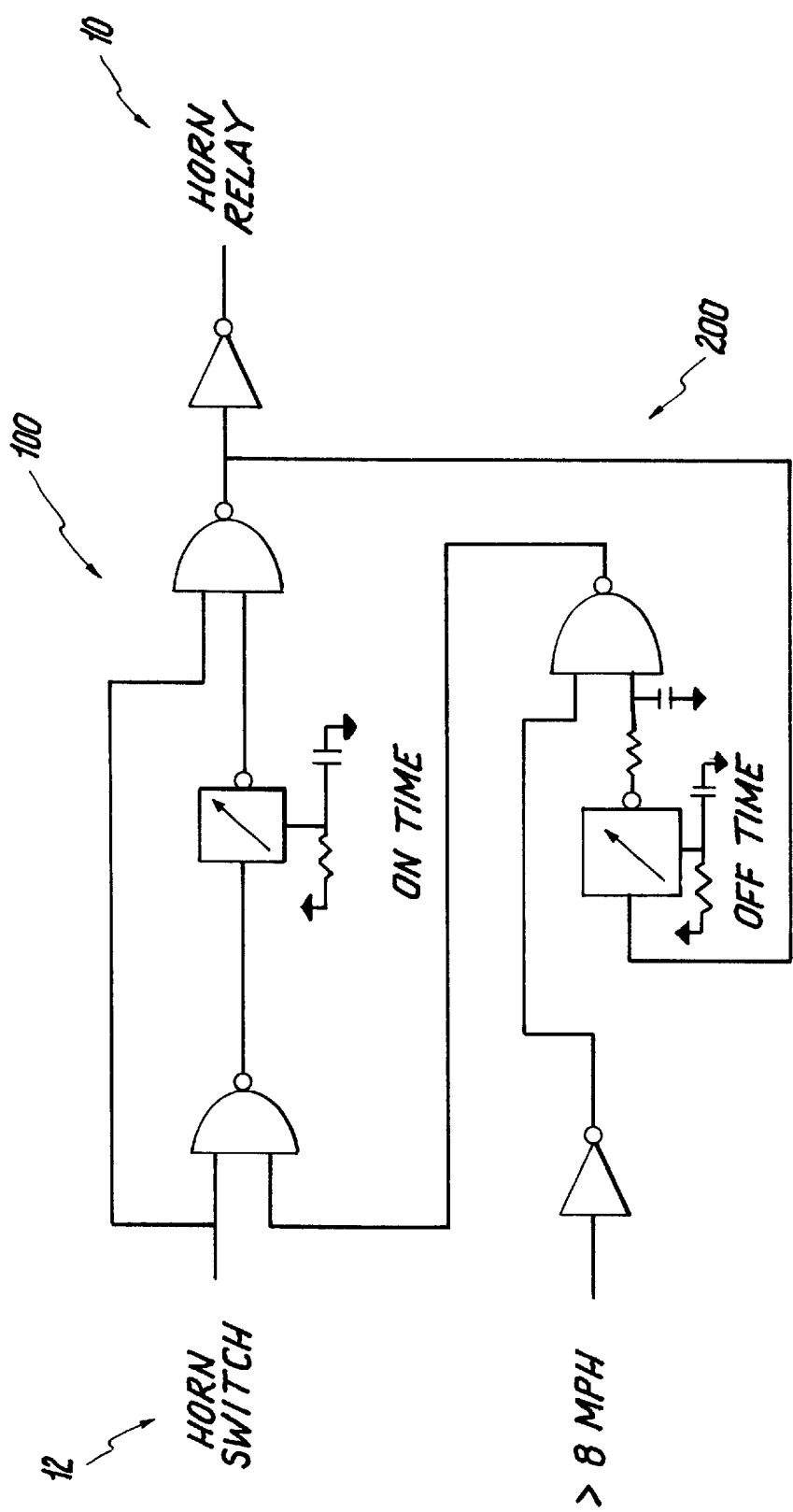
FIG. 1 is a circuit diagram depicting an embodiment of the invention.

In its various embodiments, the invention comprises a method and device for controlling the abuse of an automotive horn by preventing the horn from sounding or by limiting the sound or tone of the horn for a controlled use period. The invention includes an automotive horn control system for use in an automotive vehicle, which comprises a horn, a detector for determining the motion of the automotive vehicle, and a means for disabling or controlling the abuse of the horn for a period of time. Upon the ending of the controlled use period, the horn is restored to partial or complete use. The invention contemplates methods and devices which will repeat activation of the controlled use period.

As used herein, the term "automotive vehicle" has its common meaning in the art, and includes automobiles, buses, taxis, tractors, construction vehicles, or the like.

As used herein, the term "automotive horn" has its common meaning in the art, and includes a device installed in automotive vehicles for causing a sound for warning bystanders or other cars of the presence of the automotive vehicle.

In a first embodiment, the device controls abuse of the horn upon activation by limiting the length of the sounding period of the horn, and subsequently locking out use of the horn for a predetermined controlled use period. Normal use of the horn is restored upon the end of the controlled use period. The device may be reactivated after the end of the controlled use period.

In a second embodiment, the device controls abuse of the horn upon activation by limiting the length of the sounding period of the horn, and subsequently reducing the volume of the horn for a predetermined controlled use period. Normal use of the horn is restored upon the end of the controlled use period. The device may be reactivated after the end of the controlled use period.

In a third embodiment, the device controls abuse of the horn upon activation by modifying the sound produced from the horn to a sound or tone deemed less offensive, for a predetermined controlled use period. Normal use of the horn is restored upon the end of the controlled use period. The device may be reactivated after the end of the controlled use period.

In a fourth embodiment, the device controls abuse of the horn upon activation by muting the horn for a predetermined controlled use period. In this embodiment, the invention contemplates substitution of a warning light, such as a strobe or flashing light, to substitute for the horn. Normal use of the horn is restored upon the end of the controlled use period.

In a fifth embodiment, the device controls abuse of the horn upon activation by limiting the length of the sounding period of the horn, and subsequently progressively muting the sound level for a predetermined controlled use period. Normal use of the horn is restored upon the end of the controlled use period. The device may be reactivated after the end of the controlled use period.

In a sixth embodiment, the device controls abuse of the horn upon activation by limiting the length of the sounding period of the horn, and subsequently reducing the volume of the horn for a predetermined controlled use period. In this embodiment, the controlled use period begins upon the release of the horn switch by the driver, and ends after a predetermined time. Normal use of the horn is restored upon the end of the controlled use period. The device may be reactivated after the end of the controlled use period.

In a seventh embodiment, the device controls abuse of the horn upon activation by modifying the sound produced from the horn to a volume, sound or tone deemed less offensive, for a predetermined controlled use period. In this embodiment, the controlled use period begins upon the release of the horn switch by the driver, and ends after a predetermined time. Normal use of the horn is restored upon the end of the controlled use period. The device may be reactivated after the end of the controlled use period.

In an eighth embodiment, the device controls abuse of the horn upon activation by muting the horn for a predetermined controlled use period. In this embodiment, the invention contemplates substitution of a warning light, such as a strobe or flashing light, to substitute for the horn. In this embodiment, the controlled use period begins upon the release of the horn switch by the driver, and ends after a predetermined time, for example 30 seconds. Normal use of the horn is restored upon the end of the controlled use period.

In a ninth embodiment, the device controls abuse of the horn upon activation by limiting the length of the sounding period of the horn, and subsequently progressively muting the sound level for a predetermined controlled use period. In this embodiment, the controlled use period begins upon the release of the horn switch by the driver, and ends after a predetermined time. Normal use of the horn is restored upon the end of the controlled use period. The device may be reactivated after the end of the controlled use period.

In all of the above embodiments, the controlled use or lockout period may be activated, deactivated and reactivated by the speed of the vehicle, for example activation may occur whenever the speed of the vehicle falls below 8 miles per hour, and may end whenever the speed of the vehicle increases above 8 miles per hour. Alternatively, the controlled use or lockout period may be activated by use of the brakes, or by the attainment of a predetermined value on one or more detectors or sensors that may be installed on the vehicle. Exemplary sensors include motion sensors, vibration sensors, and acceleration sensors. The invention contemplates activation or ending of the controlled use or lockout period by a combination of any of the above described sensors or detectors.

Those skilled in the art will appreciate that a variety of circuits may be employed to carry out the above-described functions of the invention. FIG. 1 is a circuit diagram of a particular embodiment of the invention.

In FIG. 1, an electrical circuit consisting of blocks 100 and 200 are depicted. Horn relay 10 represents that part of a vehicle horn, normally activated by the driver via the horn switch 12 located in or on the steering wheel of the vehicle, and used to carry the higher current required to sound the horn itself. In this embodiment of the invention, electrical circuit block 100 is connected between the horn switch 12 and the horn relay 10 and limits the maximum time during which the horn will sound, regardless of further or continued activation of horn switch 12. Electrical circuit block 200 serves to create a delay time during which the horn switch 12 is effectively deactivated, preventing further activation of circuit block 100 and thereby of horn relay 10. An additional input to the circuit block 200, here shown as an electrical signal for speed, overrides the off timer, restoring normal operation for speeds greater than the hurdle rate of 8 mph.

The invention contemplates use of any of the various electronic components commonly used in the art. Exemplary integrated circuits that may be used in the device of the invention include a 556 dual timer, 7400 LS quad two-input Nand gate, and a 7404 hex inverter.

While there have been described particular embodiments of the invention, those skilled in the art will realize that changes and modifications can be made thereto without departing from the spirit of the invention and it is intended to claim all such changes and modifications that fall within the true scope of the invention.

All patents, applications, and publications mentioned herein are hereby incorporated by reference.

What is claimed is:

1. An automotive horn control system for use in an automotive vehicle, said system comprising a horn;

a detector for determining speed of said vehicle; and a means for disabling said horn when said speed of said vehicle exceeds a predetermined value until said speed of said vehicle falls below said predetermined value.

2. The automotive horn control system of claim 1 wherein said means for disabling said horn is a means for abating the noise volume of said horn.

3. The automotive horn control system of claim 1 wherein said means for disabling said horn is a means for modifying the tone or sound of said horn.

4. The automotive horn control system of claim 1, wherein said automotive vehicle is a taxi.

5. The automotive horn control system of claim 1, wherein said predetermined value of speed is eight miles per hour.

6. A method for controlling the use of an automotive horn in an automotive vehicle, said method comprising the steps of detecting speed of a vehicle; and disabling said horn for a period of time when said speed of a vehicle exceeds said predetermined value.

7. The method of claim 6, wherein said step of disabling said horn comprises abating the noise volume of said horn.

8. The method of claim 6 wherein said step of disabling said horn comprises modifying the tone or sound of said horn.

9. The method of claim 6, wherein said automotive vehicle is a taxi.

10. The method of claim 6, wherein said predetermined value of speed is eight miles per hour.

* * * * *